Figure 1:
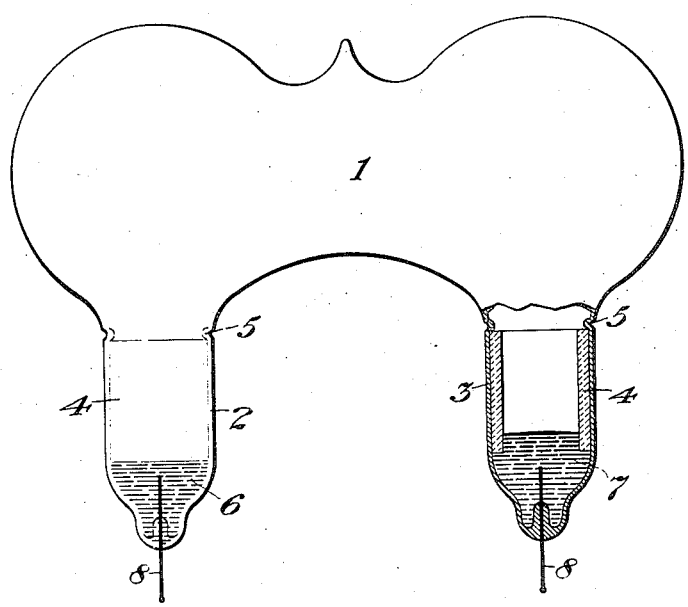

P. C. HEWITT.
VAPOR ELECTRIC DEVICE.
APPLICATION FILED JULY 1, 1905.

1,110,552.

Patented Sept. 15, 1914.

WITNESSES:
Chas. F. Clagett
W. H. Capel

INVENTOR
Peter Cooper Hewitt
BY his ATTORNEY
Charles A. Terry

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

VAPOR ELECTRIC DEVICE.

1,110,552.   Specification of Letters Patent.   Patented Sept. 15, 1914.

Application filed July 1, 1905. Serial No. 267,980.

*To all whom it may concern:*

Be it known that I, PETER COOPER HEWITT, a citizen of the United States, and resident of New York, county of New York, State of New York, have invented certain new and useful Improvements in Vapor Electric Devices, of which the following is a specification.

My invention relates to the class of electrical apparatus in which current is caused to traverse a gas or vapor path intervening between two or more electrodes, and contemplates, among other things, a means for preventing the current from disintegrating the walls of the container where one or more fluid electrodes are used, or where an electrode comes in contact with the wall of the container.

In devices of this general class, a suitable negative electrode resistance is found desirable, and this resistance is affected by a physical change of state at the negative electrode, and also by chemical action which might take place between the electrode and the walls of the vessel or container, the current facilitating any tendency toward chemical or physical reactions.

In order to prevent the current from wandering over the negative electrode and reaching a point which is practically in contact with the walls of the vessel, I insert a sleeve or ring, or tube, fitting the walls of the container more or less perfectly. The size of the ring may be such as to allow it to loosely fit within the container, care being taken that the expansion factor is proper, and it may be attached to the wall under proper conditions.

In the case of a mercury electrode I have found that a ring of vitrified porcelain, or a porcelain which contains little or no oxygen which can be liberated by the action of the apparatus, operates successfully. The inner wall of the ring or tube limits the exposed surface of the negative electrode, thus protecting the true wall of the vessel from the electrical action of the current.

Various different materials may be employed as the positive electrode, or both electrodes in the device may be of the same material thus forming a symmetrical device. The current may be led through the walls of the vessel in any suitable way for passing currents of the required quantity into the device.

When a porcelain sleeve is fitted loosely to the walls of the vessel, it may be convenient to indent the wall above the sleeve so as to prevent it from falling out of place.

Among other materials which may be used instead of porcelain there may be mentioned silica, fused quartz, various earths, and instead of mercury other fluid electrodes may be used, such as sodium and potassium mixed, which material is liquid at comparatively low temperatures.

It will be understood that other materials may be used as sleeves, such as iron, copper, carbon or certain of the compounds of carbon, or various other materials. Some of these materials are found to be difficult to free from all the gases dissolved or existing in them, and special precautions should be taken to have these materials freed from occluded gases or impurities which might impair the original vacuum established in the device. Porcelain seems to be comparatively free from these objections, and therefore, lends itself to this use with comparatively little practical difficulty.

My invention is illustrated in the accompanying drawings in which—

Figure 2:
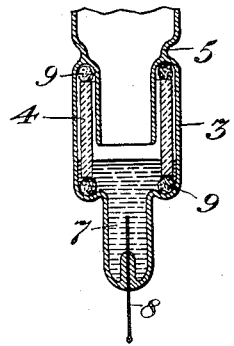

Figures 1 and 2 show two separate forms of the invention, it being understood that further modifications may be made without departing from the principle of the invention.

Referring to Fig. 1 of the drawing, 1 represents a suitable container having in this instance two electrode-containing projections 2 and 3. Within each projection there is placed a cylinder 4 of porcelain or other suitable material such as referred to but as stated above percelain usually offers certain advantages. This sleeve fits into the projection with such closeness that any tendency of the electric current to pass down between the outer wall of the vessel and the sleeve will be overcome. Small indentations, 5, may be made in the wall of the vessel above the respective cylinders for the purpose of preventing them from being accidentally displaced. Each projection contains a quantity of mercury or other suitable material, as shown at 6 and 7, the level of which is below the top of the corresponding cylinder.

Suitable leading-in wires, 8, 8, pass through the wall of the vessel into contact with the respective electrodes. Any suitable means for starting the flow of current from one electrode to the other may be employed.

In some instances it is desired to use devices of this general character as an electric circuit interrupter in which case the initial flow of current may be caused by a line voltage sufficiently high to break down the negative electrode resistance which, however, reëstablishes itself upon a sufficient drop in voltage or reversal in direction thereof. Uniformity of the breaking down stress is aided by the sleeves and may be further aided by devices for maintaining the temperature constant during operation.

In Fig. 2, the sleeve or cylinder 4 rests within a recess in the extension 3, and the construction at the extension 2 may be made similar. Here the sleeve or cylinder 4 is located between balls, 9, 9, of glass or other material adapted to take up the shock when the ring or cylinder 4 is shifted in transportation or in the normal use of the apparatus. In other respects the cylinder serves the same purpose as that shown in Fig. 1. Any convenient substitute for the glass balls may be used in place thereof.

I claim as my invention:

1. The combination of a liquid electrode in a gas or vapor apparatus, an insulating wall therefor with a protecting cylinder for said wall, together with an inner cylinder integral with the walls for holding the protecting cylinder in position.

2. An electrode for a gas or vapor electric apparatus comprising a fluid conducting material and a loose protecting shield for the wall of the vessel adapted to permit free passage of current in one direction—the shield being located between balls adapted to relieve the shocks of handling or transportation.

3. In a vapor electric apparatus having a vaporizable reconstructing electrode, an electrode chamber having an over hanging wall and a tube of insulating material surrounding the active electrode surface and lying behind said over hanging wall.

4. In a vapor electric apparatus an exhausted container, a vaporizable reconstructing electrode and a vertically restrained insulating tube within said container surrounding the operating portion of the electrode and means for directing the vapor path within said tube.

5. In a vapor electric apparatus an exhausted container, a vaporizable reconstructing electrode and a vertically restrained insulating tube within said container surrounding the operating portion of the electrode and means for preventing the passage of current outside said tube.

6. A vapor electric apparatus comprising an exhausted container, a reconstructing electrode therein and a vertically restrained insulating ring extending above and below the said cathode, together with positive means whereby the flow of current is made to pass within said ring as distinguished from between said ring and said container.

Signed at New York, in the county of New York and State of New York, this 29th day of June, A. D. 1905.

PETER COOPER HEWITT.

Witnesses:
  Wm. H. Capel,
  George H. Stockbridge.